United States Patent
Jiang

(10) Patent No.: US 8,798,827 B2
(45) Date of Patent: Aug. 5, 2014

(54) MOTOR TORQUE SMOOTHING TREATMENT METHOD FOR HYBRID POWER AND A HYBRID POWER SYSTEM

(75) Inventor: Zhaozhou Jiang, Wuhu (CN)

(73) Assignee: Chery Automobile Co., Ltd., Anhui (CN)

(*) Notice: Subject to any disclaimer, the term of this patent is extended or adjusted under 35 U.S.C. 154(b) by 366 days.

(21) Appl. No.: 12/745,653

(22) PCT Filed: Dec. 2, 2008

(86) PCT No.: PCT/CN2008/073286
§ 371 (c)(1),
(2), (4) Date: Jun. 1, 2010

(87) PCT Pub. No.: WO2009/074091
PCT Pub. Date: Jun. 18, 2009

(65) Prior Publication Data
US 2010/0305797 A1    Dec. 2, 2010

(30) Foreign Application Priority Data
Dec. 5, 2007   (CN) .......................... 2007 1 0191210

(51) Int. Cl.
*G06F 17/00* (2006.01)
*B60W 20/00* (2006.01)

(52) U.S. Cl.
USPC ........................................... 701/22; 318/432

(58) Field of Classification Search
USPC ........................................... 701/22; 318/432
See application file for complete search history.

(56) References Cited

U.S. PATENT DOCUMENTS

| | | | | |
|---|---|---|---|---|
| 5,773,944 A * | 6/1998 | Courault | ........................ | 318/432 |
| 6,441,574 B1 * | 8/2002 | Phillips et al. | ................. | 318/432 |
| 7,010,400 B2 * | 3/2006 | Hisada et al. | .................... | 701/22 |
| 7,220,217 B2 * | 5/2007 | Tamai et al. | ................... | 477/183 |
| 7,246,673 B2 * | 7/2007 | Vahabzadeh et al. | ....... | 180/65.28 |
| 7,328,091 B2 * | 2/2008 | Kimura | ........................... | 701/22 |

(Continued)

FOREIGN PATENT DOCUMENTS

| CN | 1528612 A | 9/2004 |
|---|---|---|
| CN | 1895944 A | 1/2007 |

(Continued)

OTHER PUBLICATIONS

European Patent Application No. 08859429.6, European Search Report, dated Nov. 14, 2011, 7 pages.

(Continued)

*Primary Examiner* — John R Olszewski
*Assistant Examiner* — Jean-Paul Cass
(74) *Attorney, Agent, or Firm* — Kilpatrick Townsend & Stockton LLP

(57) ABSTRACT

A motor torque smoothing process method includes judging the required work mode of the motor (3) and the current work mode of the motor (3); judging the transition process of the motor (3) based on said required work mode and said current work mode; determining the smoothing time parameter of the motor torque and the target torque based on said judged transition process; calculating the increasing step length of the current output torque based on the said detailed smoothing time parameter, the target torque and the current actual output torque; therefore calculating the actual output torque based on said increasing step length and the current actual output torque.

2 Claims, 5 Drawing Sheets

(56) References Cited

U.S. PATENT DOCUMENTS

| | | | |
|---|---|---|---|
| 7,427,849 B2 * | 9/2008 | Kaneko et al. | 318/801 |
| 7,653,466 B2 * | 1/2010 | Egami et al. | 701/22 |
| 7,759,885 B2 * | 7/2010 | Yamada et al. | 318/400.15 |
| 8,046,123 B2 * | 10/2011 | Egami et al. | 701/22 |
| 2002/0063540 A1 * | 5/2002 | Oshima et al. | 318/139 |
| 2004/0069272 A1 * | 4/2004 | Allen et al. | 123/406.23 |
| 2006/0032684 A1 * | 2/2006 | Rayl | 180/65.2 |
| 2009/0128070 A1 * | 5/2009 | Brown | 318/400.13 |
| 2010/0286855 A1 * | 11/2010 | Yang | 701/22 |

FOREIGN PATENT DOCUMENTS

| | | |
|---|---|---|
| CN | 101259845 A | 9/2008 |
| JP | 2004330924 A | 11/2004 |
| JP | 2006046578 A | 2/2006 |
| JP | 2007083934 A | 4/2007 |

OTHER PUBLICATIONS

International Search Report for PCT/CN08/073286 mailed Feb. 19, 2009.

* cited by examiner

MOTOR TORQUE SMOOTHING TREATMENT METHOD FOR HYBRID POWER AND A HYBRID POWER SYSTEM

CROSS-REFERENCES TO RELATED APPLICATIONS

The present application claims priority to PCT/CN2008/073286 filed Dec. 2, 2008 which claims priority to Chinese Patent Application No. 200710191210.3 filed Dec. 5, 2007 entitled "A MOTOR TORQUE SMOOTHING TREATMENT METHOD FOR HYBRID POWER AND A HYBRID POWER SYSTEM", incorporated by reference for all purposes.

FIELD OF THE INVENTION

The present invention relates to the field of controlling a motor in a hybrid powered vehicle and in particular to a method for smoothing a torque of a motor and a hybrid power system.

BACKGROUND OF THE INVENTION

At present, both "environment protection and energy conservation" and "perfect harmony of human, vehicles and nature" have become common themes in the vehicle industry along with the increasingly severe phenomenon of global warming and the gradually grievous petroleum supply and demand contradiction.

A hybrid powered vehicle integrates reasonably motor drive with engine drive. The advantage of the motor drive is utilized to remedy the disadvantage of the engine drive, and the engine is kept operative in an optimal condition, thereby enabling such functions of the engine as Idle stop, drive assistance, regenerative brake energy recycling, etc. Thus, the hybrid powered vehicle improves the performance of steering the vehicle and saves the energy consumption thereof. And, the engine emission is lowered and the advantages of both the internal-combustion engine vehicle and the electrical vehicle are fully utilized. Therefore, the hybrid powered vehicle is a vehicle with low emission and low oil consumption and is the most worthy of a practical development at present.

Since the hybrid power system is a combination of the engine drive and the motor drive, the performance of controlling the motor drive strongly influences that of the hybrid power system. In order to achieve good smoothness of the entire vehicle using the hybrid power system, smoothing of a torque of a motor in the hybrid power is an essential factor in a system for controlling the motor in the hybrid power.

For smoothing of a torque of a motor in the prior art, typically a torque variation step is set by a motor control system to simply control the slope of a torque variation curve. This control method results in the continuous but unsmooth torque variation curve as illustrated in FIG. 4. Moreover, this control method results in a long response time in the case of a significantly varied torque demand, adversely influencing an acceleration demand for the entire vehicle using the motor control system. Therefore, it is very necessary to smooth reasonably and efficiently a torque of a motor in a hybrid power system.

SUMMARY OF THE INVENTION

An object of the invention is to provide a method for smoothing a torque of a motor in a hybrid power and a hybrid power system to improve smoothness of output of the torque of the motor in the hybrid power and ensure a timely response to the torque of the motor, thereby ensuring acceleration and smoothness of a vehicle using the hybrid power system.

Technical solutions of the invention are as follows.

The invention provides a hybrid power system including an engine (1), a motor (3) and a gear box (4) mechanically connected through a shaft (2), the motor (3) is an integrated starter/generator, and a Hybrid Control Unit HCU (9), an Engine Management System EMS (8), a Motor Control Unit MCU (10) and a Battery Management System BMS (11) communicate through a CAN (Controller Area Network) bus (12), wherein:

the Hybrid Control Unit HCU (9) is adapted to determine a current operation mode and a demanded operation mode of the motor and further conversion between the operation modes of the motor, and determine from the conversion a time parameter for smoothing a torque of the motor and a target torque; to determine whether the demanded operation mode is stable or not and lock the stable demanded operation mode when the demanded operation mode is stable and the conversion is not conversion into an idle mode; and to calculate an incremental step of a current actual output torque from the time parameter and the difference between the target torque and the current actual output torque and further calculate an actual output torque from the incremental step and the current actual output torque, and transmit the calculated actual output torque to the MCU (10).

The invention further provides a method for smoothing a torque of a motor in a hybrid power including determining a demanded operation mode and a current operation mode of the motor;

determining, from the demanded operation mode and the current operation mode, conversion between the operation modes of the motor;

determining from the determined conversion a time parameter for smoothing a torque of the motor and a target torque; and calculating an incremental step of a current actual output torque from the time parameter and the difference between the target torque and the current actual output torque, and further calculating an actual output torque from the incremental step and the current actual output torque.

Wherein after determining the conversion and before determining the time parameter for smoothing the torque of the motor and the target torque, the method further includes:

determining whether the demanded operation mode of the motor is stable or not, and locking the stable demanded operation mode if the demanded operation mode is stable and the conversion is not conversion into an idle mode.

Calculating the incremental step of the current actual output torque from the time parameter and the difference between the target torque and the current actual output torque and further calculating the actual output torque of the motor from the incremental step and the current actual output torque includes:

calculating the actual output torque of the motor by the equation of $T_{out} = [t_{sample}/(t_{sample}+t)] \times (T_{new} - T_{old}) + T_{old}$;

wherein $T_{out}$ is an actual output torque, $t_{sample}$ is a sampled time parameter, $t$ is a time parameter for smoothing a torque, $T_{new}$ is a target torque, and $T_{old}$ is the actual output torque $T_{out}$ calculated in the last cycle.

Determining the current operation mode of the motor includes: determining the current operation mode of the motor from the current actual output torque of the motor.

The operation mode includes an idle mode, a first motoring mode, a second motoring mode, a power generation mode, and a regenerative brake mode.

Conversion between the operation modes of the motor includes conversion into the idle mode, conversion from the idle mode, and non-conversion.

Determining the time parameter for smoothing the torque of the motor and the target torque from the determined conversion includes:

determining the time parameter for smoothing the torque of the motor and the target torque from the locked demanded operation mode when the conversion is conversion into the idle mode;

determining the time parameter for smoothing the torque of the motor from the determined demanded operation mode and determining that the target torque is an actual demanded torque when the conversion is conversion from the idle mode; and determining that the time parameter for smoothing the torque of the motor is 170 ms and determining that the target torque is the actual demanded torque when the conversion is non-conversion.

The method for smoothing a torque of a motor in a hybrid power and the hybrid power system according to the invention has the following features and advantages.

According to the invention, the conversion between the operation modes of the motor is classified as conversion into the idle mode and conversion from the idle mode in view of the characteristics of the motor. The time parameter for smoothing the torque of the motor and the target torque is determined according to the conversion, the current operation mode and the demanded operation mode of the motor. Then, the magnitude of the actual output torque is calculated by the equation. Since the actual output torque is calculated with reference to the time parameter for smoothing the torque of the motor, the time for smoothing the torque of the motor will not be increased or decreased with the varying demanded torque of the motor, thereby improving temporal responsiveness of the torque of the motor. Moreover, the difference between the target torque and the actual output torque is gradually decreased, and correspondingly, the variation step of the calculated actual output torque can be gradually decreased to truly achieve smooth transition of the torque of the motor and more comfortable steering.

Moreover, the method and the system according to the invention determines the current operation mode of the motor from the current actual output torque of the motor, which means a feedback control, so that the method and system according to the invention can achieve more reliable and stable smoothing of a torque.

DETAILED DESCRIPTION OF THE INVENTION

A target operation mode of a motor includes five modes, i.e., an idle mode, a first motoring mode, a second motoring mode, a power generation mode, and a regenerative brake mode, wherein:

the first motoring mode relates to an auxiliary drive to improve the efficiency of an engine;

the second motoring mode relates to an auxiliary drive to improve the performance of the engine; and the regenerative brake mode is a power generation mode to recycle brake energy.

Meanwhile, the second motoring mode and the regenerative brake mode are motor operation modes demanding for a strict temporal response. The motor can not be converted directly from either of the motoring modes into the power generation mode or from the power generation mode into either of the motoring modes, because such two conversions have to be performed through the idle mode. Thus, conversion from either of the motoring modes into the power generation mode, from the power generation mode to either of the motoring modes, from either of the motoring modes into the idle mode, or from the power generation mode into the idle mode, which occurs with the target operation mode and a current operation mode of the motor, can be deemed as conversion into the idle mode, particularly as depicted in Table 1.

TABLE 1

|  | Idle | First motoring mode | Second motoring mode | Power generation | Regenerative brake |
|---|---|---|---|---|---|
| Zero torque | 0 | 0 | 0 | 0 | 0 |
| Electrical | 1 | 0 | 0 | 1 | 1 |
| Power generation | 1 | 1 | 1 | 0 | 0 |

Table 2 is a table of conversion of the motor from the idle mode. Conversion of the motor from the zero torque mode into either of the motoring modes or the power generation mode can be deemed as conversion from the idle mode, particularly as depicted in Table 2.

TABLE 2

|  | Idle | First motoring mode | Second motoring mode | Power generation | Regenerative brake |
|---|---|---|---|---|---|
| Zero torque | 0 | 1 | 1 | 1 | 1 |
| Electrical | 0 | 0 | 0 | 0 | 0 |
| Power generation | 0 | 0 | 0 | 0 | 0 |

Figure 1:
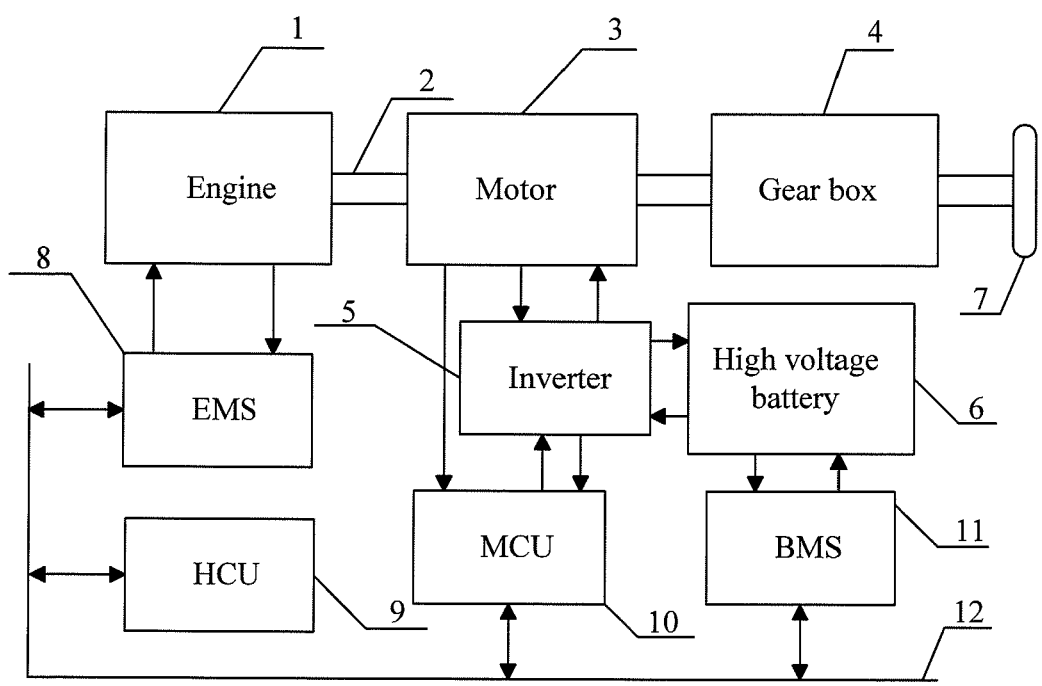
FIG. 1 is a schematic structural diagram illustrating a hybrid power system according to the invention.

As illustrated in FIG. 1, in the hybrid power system according to the invention, an engine 1, a motor 3 and a gear box 4 are mechanically connected through a shaft 2, the motor 3 is an integrated starter/generator (ISG), and a Hybrid Control Unit (HCU) 9, an Engine Management System (EMS) 8, a Motor Control Unit (MCU) 10 and a Battery Management System (BMS) 11 communicates through a CAN bus 12.

The Hybrid Control Unit HCU 9 determines and controls the operation mode of the motor 3 and is adapted to:

determine a current operation mode and a demanded operation mode of the motor and further conversion between the operation modes of the motor, and determine from the conversion a time parameter for smoothing a torque of the motor and a target torque; determine whether the demanded operation mode is stable or not and lock the stable demanded operation mode when the demanded operation mode is stable and the conversion is not conversion into the idle mode; and calculate an incremental step of a current actual output torque from the time parameter and the difference between the target torque and the current actual output torque and further calculate an actual output torque from the incremental step and the current actual output torque, and transmit the calculated actual output torque to the MCU (10).

A control process of smoothing the torque of the motor in the Hybrid Control Unit HCU 9 will be explained hereinafter with reference to FIG. 2 and FIG. 3.

Figure 2:
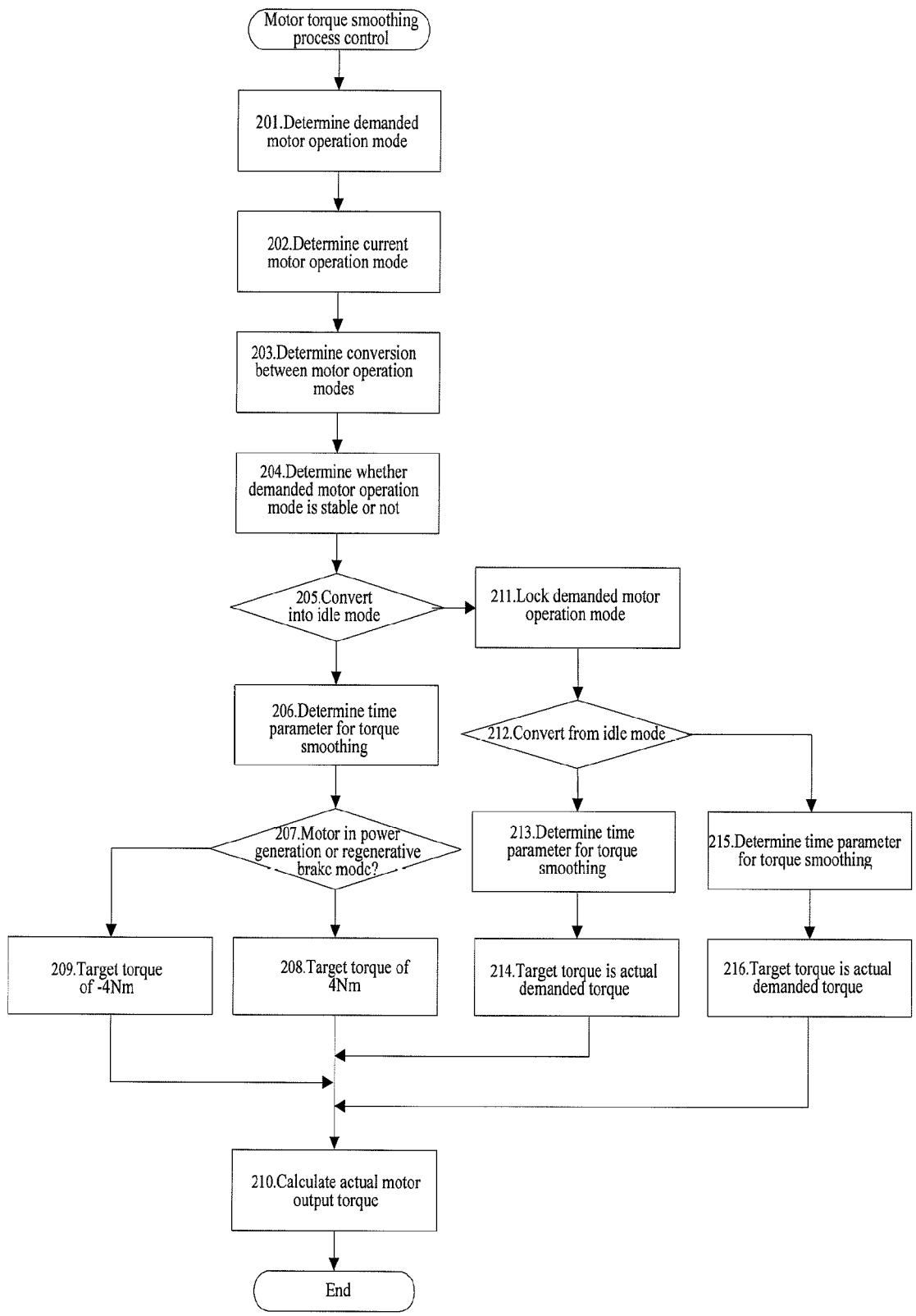
FIG. 2 is a schematic flow diagram illustrating a method for smoothing a torque of a motor according to the invention.

FIG. 2 is a schematic flow chart illustrating a method for smoothing a torque of a motor in a hybrid power according to the invention. As illustrated in FIG. 2, the flow includes the following steps.

Step 201: A demanded operation mode of the motor is determined.

The demanded operation mode of the motor includes five modes, i.e., an idle mode, a first motoring mode, a second motoring mode, a power generation mode, and a regenerative brake mode.

Step 202: A current operation mode of the motor is determined.

Here, the current operation mode of the motor is determined from an actual output torque Tout calculated in the step S210 in the last cycle, i.e., the current actual output torque of the motor.

Figure 3:
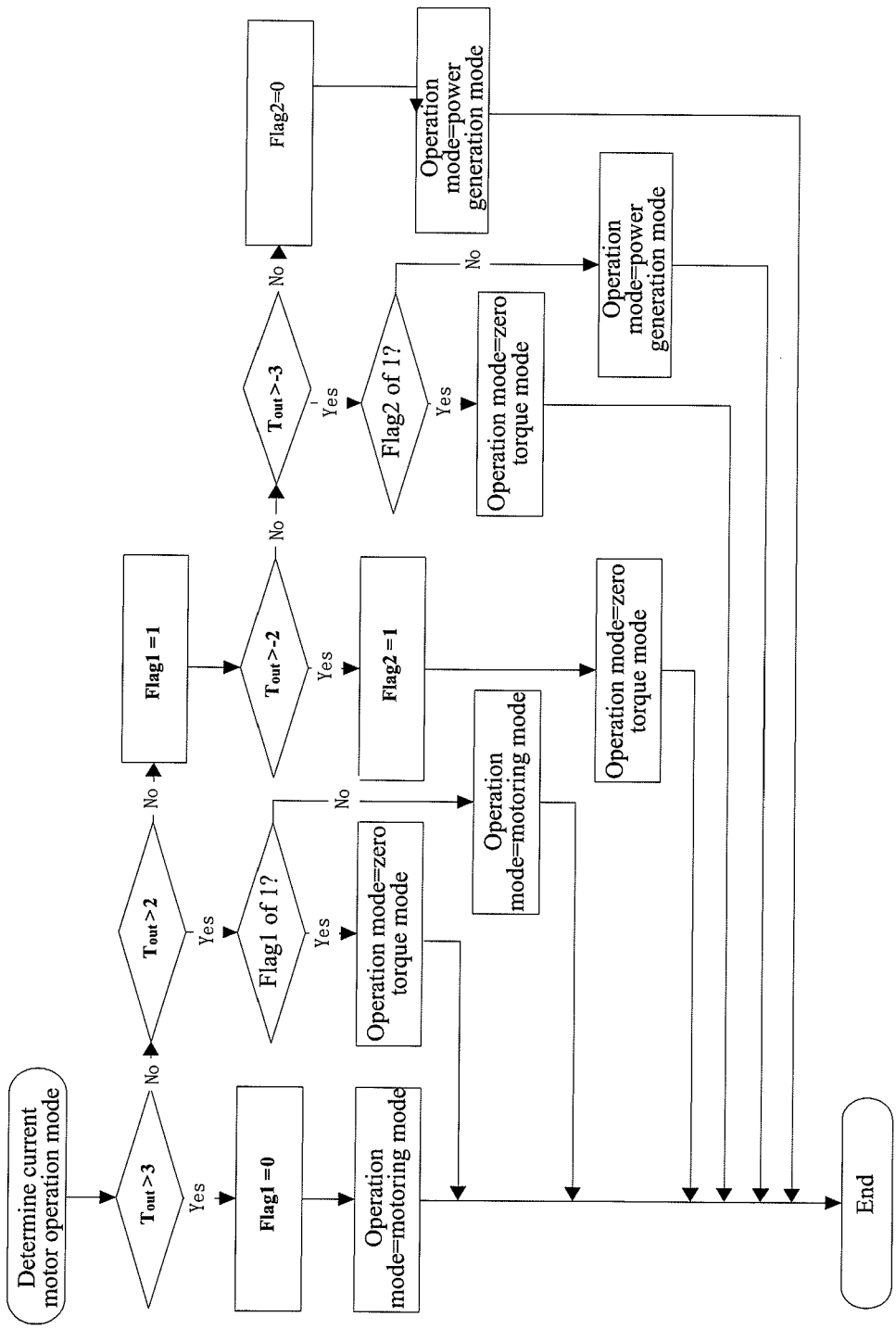
FIG. 3 is a schematic flow diagram illustrating controlling a current operation mode of a motor.
Figure 4:
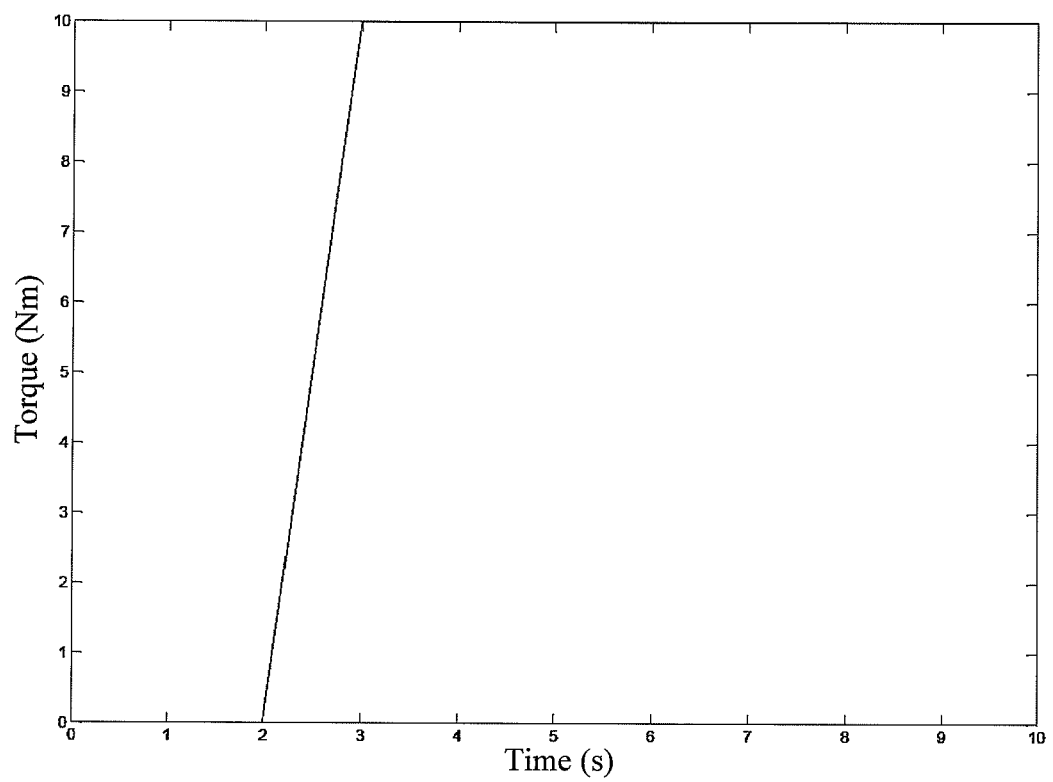
FIG. 4 illustrates a smooth curve of a torque of a motor resulting from smoothing of the torque of the motor in the prior art.

A method for determining the current operation mode of the motor is as illustrated in FIG. 3. In FIG. 3, the current operation mode of the motor includes a zero torque mode, a motoring mode and a power generation mode. A corresponding operation mode is determined from the actual output torque Tout of the motor.

Particularly, if Tout is larger than 3 Nm, then the motor is deemed as operating in the motoring mode; if Tout is smaller than −3 Nm, then it is deemed as operating in the power generation mode; if Tout is between −2 Nm and 2 Nm, then it is deemed as in the zero torque mode; if Tout is larger than 2 Nm and smaller than 3 Nm, then the motor is deemed as operating in the motoring mode if Flag1 is zero (which indicates that the output torque of the motor ever reached 3 Nm) or still in the zero torque mode if Flag1 is other than zero; and if the output torque is larger than −3 Nm and smaller than −2 Nm, then the motor is deemed as operating in the power generation mode if Flag2 is zero or still in the zero torque mode if Flag2 is other than zero.

Step 203: Conversion between the operation modes of the motor is determined from the demanded operation mode and the current operation mode of the motor.

In the method for smoothing a torque of a motor according to the invention, conversion between the operation modes of the motor is classified as conversion into and conversion from the idle mode, particularly as depicted in Table 1 and Table 2.

Moreover, non-conversion between the operation modes is also possible.

The conversion includes the foregoing two conversions and also the non-conversion.

Step 204: It is determined whether the demanded operation mode of the motor is stable or not.

In this step, assuming that an operation cycle of the controller is 10 ms, typically the demanded operation mode can be determined as stable if the demanded operation mode is consistent for 40 ms, that is, if the demanded operation mode of the motor determined in the step 201 is always the same in four operation cycles.

An initial operation mode of the motor is the idle mode.

Step 205: It is determined whether to convert into the idle mode, and if so, then the flow goes to the step 206; otherwise, the flow goes to the step 211.

Step 206: A time parameter for smoothing the torque of the motor to be converted into the idle mode is determined.

The time parameter for smoothing the torque of the motor is determined from the stable demanded operation mode of the motor locked in the step 211. If the stable demanded operation mode of the motor is the first motoring mode, then the time parameter for smoothing the torque of the motor can be set as 140 ms; if the stable demanded operation mode of the motor is the second motoring mode, then the time parameter for smoothing the torque of the motor can be set as 130 ms; if the stable demanded operation mode of the motor is the power generation mode, then the time parameter for smoothing the torque of the motor can be set as 150 ms; and if the stable demanded operation mode of the motor is the regenerative brake mode, then the time parameter for smoothing the torque of the motor can be set as 130 ms.

The flow of steps illustrated in FIG. 2 is executed cyclically in the hybrid power system. The stable demanded operation mode of the motor locked in the step 211 is the stable demanded operation mode of the motor locked in the step 211 performed the latest time relative to current execution of the flow of steps illustrated in FIG. 2.

Step 207~Step 209: A target torque is determined from the stable demanded operation mode of the motor; it is determined whether the table demanded operation mode is the power generation mode or the regenerative brake mode or not, and if the table demanded operation mode is the power generation mode or the regenerative brake mode, then the target torque of the motor can be set as 4 Nm, otherwise, the target torque of the motor is set as −4 Nm; and the flow goes to the step 210.

Step 210: An actual output torque of the motor is determined from the equation of Tout=[tsample/(tsample+t)]× (Tnew−Told)+Told, and the present flow ends.

Here, tsample is a sampled time parameter, typically 10 ms for the controller, t is a time parameter for smoothing a torque, Tnew is a target torque, and Told is a value of the actual output torque Tout for the last cycle, which is initially zero.

Figure 5:
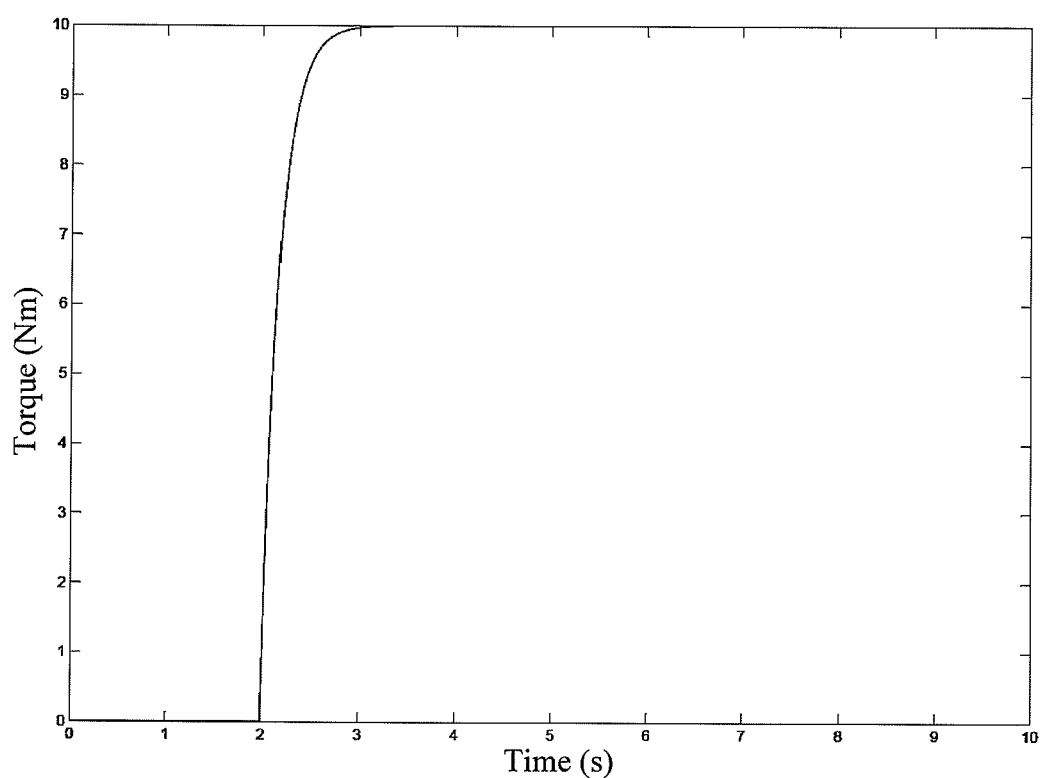
FIG. 5 illustrates a smooth curve of a torque of a motor resulting from smoothing of the torque of the motor according to the invention.

As can be apparent from the foregoing equation, for calculation of the actual output torque, the time parameter for smoothing the torque is set as a constant value, and the difference between the target torque and the actual output torque (Tnew−Told) is gradually decreased in value with time, so that a variation step of the resulting actual output torque is gradually decreased with time, thereby truly achieving smooth transition of the torque of the motor and more comfortable steering. Reference is made to FIG. 5 showing a diagram illustrating the torque smoothing curve resulting from the motor torque smoothing method as illustrated in FIG. 2.

The actual output torque calculated in this step is a value, and typically the value of the actual output torque shall be input into the MCU to realize the actual output torque.

Step 211: The stable demanded operation mode is locked.

Specifically, the stable demanded operation mode of the motor determined in the step 204 is locked.

Step 212~Step 214: A time parameter for smoothing a torque and a target torque are determined in the case of conversion from the idle mode, and thereafter the step 210 is executed to calculate a Tout.

Here, the time parameter for smoothing the torque is determined from the demanded operation mode of the motor determined in the step 201. If the demanded operation mode is the first motoring mode, then the time parameter for smoothing the torque can be set as 330 ms; if the demanded operation mode is the second motoring mode, then the time parameter for smoothing the torque can be set as 250 ms; if the demanded operation mode is the power generation mode, then the time parameter for smoothing the torque can be set as 320 ms; and if the demanded operation mode is the regenerative brake mode, then the time parameter for smoothing the torque can be set as 350 ms; and the target torque is just the actual demanded torque.

Step 212, step 215 and step 216: If neither conversion into nor conversion from the idle mode is intended, then it is deemed that no conversion between modes will be required, which is a relatively secured scenario. In such scenario, the time parameter for smoothing the torque is set as 170 ms and the target torque is just the actual demanded torque, and thereafter, the flow goes to the step 210 to calculate a Tout from the equation.

The invention claimed is:

1. A method for smoothing a torque of a motor in a hybrid power, comprising:
   determining, by an HCU, a demanded operation mode and a current operation mode of the motor;
   determining, by the HCU, from the demanded operation mode and the current operation mode, conversion between the operation modes of the motor, wherein the operation modes comprise an idle mode, a first motoring mode, a second motoring mode, a power generation mode, and a regenerative brake mode;
   determining, by the HCU, whether the demanded operation mode does not change at least in four operation cycles of the HCU;
   determining, by the HCU, a time parameter for smoothing the torque of the motor and a target torque according to the demanded operation mode if the demanded operation mode does not change at least in the four operation cycles of the HCU; and
   calculating, by the HCU, an incremental step of a current actual output torque from the time parameter and the difference between the target torque and the current actual output torque, and further calculating an actual output torque from the incremental step and the current actual output torque;
   wherein the conversion between the operation modes of the motor comprises conversion into the idle mode, and conversion from the idle mode;
   wherein determining, by the HCU, the time parameter for smoothing the torque of the motor and the target torque according to the demanded operation mode comprises:
   determining, by the HCU, the time parameter for smoothing the torque of the motor and the target torque according to the demanded operation mode if the conversion is conversion into the idle mode;
   determining, by the HCU, the time parameter for smoothing the torque of the motor from the determined demanded operation mode and determining that the target torque is an actual demanded torque if the conversion is conversion from the idle mode; and
   determining, by the HCU, that the time parameter for smoothing the torque of the motor is 170 ms and determining that the target torque is the actual demanded torque if the operation mode of the HCU does not change.

2. The method according to claim 1, wherein calculating, by the HCU, the incremental step of the current actual output torque from the time parameter and the difference between the target torque and the current actual output torque, and further calculating the actual output torque of the motor from the incremental step and the current actual output torque comprises:
   calculating, by the HCU, the actual output torque of the motor by the equation of Tout=[tsample/(tsample+t)]×(Tnew−Told)+Told;
   wherein Tout is an actual output torque, tsample is a sampled time parameter, t is a time parameter for smoothing a torque, Tnew is a target torque, and Told is a value of the actual output torque Tout calculated in the last cycle.

\* \* \* \* \*